US012027283B2

(12) United States Patent
Zhang et al.

(10) Patent No.: US 12,027,283 B2

(45) Date of Patent: Jul. 2, 2024

(54) BATCHING SYSTEM FOR PRODUCING SPECIAL CABLES

(71) Applicant: SHENZHEN SUPERLINK TECHNOLOGY CO., LTD., Guangdong (CN)

(72) Inventors: Lin Zhang, Guangdong (CN); Quanbao Qiao, Guangdong (CN)

(73) Assignee: SHENZHEN SUPERLINK TECHNOLOGY CO., LTD., Shenzhen (CN)

( * ) Notice: Subject to any disclaimer, the term of this patent is extended or adjusted under 35 U.S.C. 154(b) by 360 days.

(21) Appl. No.: 17/569,707

(22) Filed: Jan. 6, 2022

(65) Prior Publication Data

US 2022/0215990 A1 Jul. 7, 2022

Related U.S. Application Data

(63) Continuation of application No. PCT/CN2021/119877, filed on Sep. 23, 2021.

(30) Foreign Application Priority Data

Jan. 5, 2021 (CN) ......................... 202110007449.0

(51) Int. Cl.
*H01B 13/26* (2006.01)
*B65H 54/24* (2006.01)
*B65H 54/44* (2006.01)

(52) U.S. Cl.
CPC ............. *H01B 13/26* (2013.01); *B65H 54/24* (2013.01); *B65H 54/44* (2013.01);
(Continued)

(58) Field of Classification Search
CPC ........ H01B 13/26; B65H 54/24; B65H 54/44; B65H 2701/34; B65H 2701/36; Y10T 29/532; Y10T 29/53261
See application file for complete search history.

(56) References Cited

U.S. PATENT DOCUMENTS 10,113,253 B2 * 10/2018 Hottes .................... B65H 54/28

FOREIGN PATENT DOCUMENTS

JP 2016225282 A * 12/2016 ......... H01B 13/0207

OTHER PUBLICATIONS

Suh, J., "A Novel Cable Actuation Mechanism for 2-DOF Hyper-redundant Bending Robot Composed of Pulleyless Rolling Joints," 2018 IEEE/RSJ International Conference on Intelligent Robots and Systems (IROS), Madrid, Spain, 2018, pp. 961-966. (Year: 2018).*

* cited by examiner

*Primary Examiner* — A. Dexter Tugbang

(57) ABSTRACT

A batching system for producing special cables includes a motor, a loading plate, wire pulling rollers, a transmission steel pipe and a batching motor; the transmission steel pipe is rotatably connected to an upper end surface of the loading plate by a bracket; the motor is fixedly arranged on a side wall of a mounting bracket; the wire pulling rollers are rotatably connected to an upper end surface of the loading plate; the system further includes: a wiring mechanism, a replacing mechanism and a driving mechanism; the wiring mechanism is coaxially and fixedly connected with an outer end surface of the transmission steel pipe; the replacing mechanism is sleeved on the outer end surface of the transmission steel pipe; the driving mechanism is fixedly mounted on a lower end surface of the loading plate; a winding mechanism for winding wires is coaxially and fixedly arranged on the transmission steel pipe.

6 Claims, 9 Drawing Sheets

A

(52) U.S. Cl.
CPC ......... *B65H 2701/34* (2013.01); *Y10T 29/532* (2015.01); *Y10T 29/53261* (2015.01)

A

B

C

D

BATCHING SYSTEM FOR PRODUCING SPECIAL CABLES

CROSS-REFERENCE TO RELATED APPLICATION

The present application is a continuation of international application of PCT application No. PCT/CN2021/119877 filed on Sep. 23, 2021, which claims the priority benefit of China application No. 202110007449.0 filed on Jan. 5, 2021. The entirety of the above-mentioned patent applications is incorporated herein by reference and made a part of this specification.

TECHNICAL FIELD

The present application relates to the technical field of batching for producing cables, and particularly relates to a batching system for producing special cables.

BACKGROUND ART

A cable is usually a rope-like cable formed by twisting several lead wires or several groups of lead wires (each group at least comprises two lead wires); each group of lead wires are insulated from each other and are often twisted around a center; and the whole outer surface is coated with a highly insulated covering layer. The cable has the characteristics of being energized inside and insulated outside. In the existing equipment, multiple sub-wire coils are carried at one time for rotating and winding. When the sub-wire coils are used up, the machine needs to be stopped for batching; the sub-wire coils are too large, and the downtime is too long; after batching, threading is carried out, then the equipment is started to continue winding, so that the problems of poor continuous workability and low working efficiency are caused; secondly, manual threading is needed during shutting down or before starting the equipment for each time, the process is too troublesome; the threading hole is too small, so that threading is inconvenient and time-consuming. Based on this, the present application designs a batching system for producing special cables so as to solve the above-mentioned problems.

SUMMARY

The present application provides a batching system for producing special cables. The present application aims to solve the problems of poor continuous workability and low working efficiency caused due to the fact that multiple sub-wire coils are carried at a time for rotating and winding in the existing equipment disclosed in the background art, when the sub-wire coils are used up, the machine needs to be stopped for batching, the sub-wire coils are too large, the downtime is too long, after batching, threading is carried out, then the equipment is started to continue winding. Secondly, the present application aims to solve the problems that manual threading is needed during shutting down or before starting the equipment for each time, the process is too troublesome, the threading hole is too small, and threading is inconvenient and time-consuming.

In order to achieve the above-mentioned purpose, the present application provides the following technical solution. A batching system for producing special cables includes a motor, a loading plate, wire pulling rollers, a transmission steel pipe and a batching motor, wherein, the transmission steel pipe is rotatably connected to an upper end surface of the loading plate by a bracket; the motor is fixedly arranged on a side wall of a mounting bracket; the wire pulling rollers are rotatably connected to an upper end surface of the loading plate; and wherein, the batching system for producing special cables further comprises: a wiring mechanism, a replacing mechanism and a driving mechanism; the wiring mechanism is coaxially and fixedly connected with an outer end surface of the transmission steel pipe; the replacing mechanism is sleeved on the outer end surface of the transmission steel pipe; the driving mechanism is fixedly mounted on a lower end surface of the loading plate; a winding mechanism for winding wires is coaxially and fixedly arranged on the transmission steel pipe;

the wiring mechanism comprises a rotating disc that is coaxially fixed on an outer wall of the transmission steel pipe; a plurality of wire storage slot surrounding an axis are formed on the rotating disc; a baffle is arranged on a side wall of the wire storage slot; a wire storage plate that is slidably connected to a side wall of the wire storage slot is arranged above the baffle; one end of a screw is rotatably arranged at a lower end of the wire storage plate; the screw passes through the baffle and is in threaded connection with the baffle; the screw passes through other end of the baffle and is axially slidably connected to an output shaft of the batching motor at a lower end of the baffle; a bottom surface of a wire winding column is horizontally slidably arranged on the wire storage plate; a concave ring-shaped groove is provided at an upper end of the wire winding column; a locking block for synchronizing speeds of an upper and a lower wire winding column is provided at a top end of the wire winding column; a locking groove is provided at a lower end surface of the wire winding column; a through hole with a same diameter as that of the wire winding column is formed at a top end of the wire storage slot; one end of a compression spring that faces towards an axis of the through hole is fixedly arranged in an squeezing groove formed around the axis of the through hole on a side wall of an upper end of the through hole; a steel ball corresponding to the concave ring-shaped groove is fixedly arranged at other end of the compression spring; an eddy current coil for heating welding wire heads and wire tails is fixedly arranged in middle of the wire storage slot;

the replacing mechanism comprises a synchronization disc; a large chamfer is arranged at center of a rear end of the synchronization disc; a plurality of replacing grooves are formed in the synchronization disc around the axis; each replacing groove is fixedly connected with a replacing plate; each replacing plate is slidably connected with a wire winding column; a bottom end of each wire winding column is in contact with one end of a contact rod; the middle of each contact rod is rotatably connected with an end surface of the synchronization disc; other end of each contact rod is in contact connection with an outer wall of the transmission steel pipe; a sliding groove is axially formed on the transmission steel pipe; clamping bars are rotatably arranged in the sliding groove;

a gradient groove is formed in an end surface close to the rotating disc of the synchronization disc; the gradient groove gradually becomes shallow as going further away from an axis of the synchronization disc; an inner bottom surface of the gradient groove is slidably connected with a synchronization block; side walls close to the axis of the synchronization block and the gradient groove are respectively fixedly connected with two ends of a centrifugal spring; a synchronization ring-shaped groove that is coaxial with the synchronization disc is formed in middle of the synchronization disc; a synchronization clamping groove that matches with the synchronization block is formed in a side wall close to the synchronization disc of the rotating disc; an end surface close to the synchronization disc of the rotating disc is fixedly connected with a synchronization ring-shaped block corresponding to the synchronization ring-shaped groove; and the driving mechanism comprises a synchronization belt that is sleeved on an outer side of an output shaft passing through the bracket of the motor; the synchronization belt passes through an avoiding hole of the loading plate to connect to a transmission shaft of a transmission assembly; the transmission assembly transmits power to shafts passing through the loading plate of the wire pulling rollers; and two wire pulling rollers are respectively coaxially and fixedly connected with a synchronization gear; and the synchronization gears are engaged with each other.

In operation, the equipment is assembled and fixed; the cable core passes through the transmission steel pipe and the wire pulling rollers in turn; a plurality of sub-wires pass through the winding mechanism and are wound on the outer side of the cable core; the motor is started to rotate clockwise (see from the right side of FIG. 4), so that the motor drives the transmission steel pipe to rotate anticlockwise; the transmission steel pipe rotates to drive the rotating disc to rotate and also drive the winding mechanism to rotate at the same time; meanwhile, the motor drives the transmission assembly through the synchronization belt to operate; the transmission assembly drives a wire pulling roller on the left side to rotate anticlockwise (as shown in FIG. 4); the lower ends of the two wire pulling rollers rotate with the same speeds by means of the synchronization gears so as to pulling the wound cables to a next process; after sub-wires on the wire winding column in a working position are used up, the batching motor is started to rotate; the batching motor drives the wire storage plate through the screws to move upward along the wire storage slot such that a fully-loaded wire winding column moves upward to be close to the bottom end of the wire winding column that is used up; the upper end of the lower wire winding column is inserted into the center hole of the upper wire winding column; under the action of friction force, the upper wire winding column can enable the lower wire winding column to rotate (as shown in FIG. 3); when the rotating speed of the lower wire winding columns gradually approaches that of the upper wire winding columns, the batching motor continues to rotate so that the locking block of the lower wire winding columns engages with the locking groove of the upper wire winding column; at this moment, the eddy current coil is started so that a tin-coated joint of the lower wire winding column is connected with the tail end of the upper wire winding column. As the winding continues, the batching motor continues to operate to drive the fully-loaded lower wire winding column moves up along the side wall of the wire storage slot, such that the concave ring-shaped groove of the empty upper wire winding column squeezes the steel balls and the steel balls further squeeze the compression springs to retract to the squeezing groove; as the batching motor continues to move, the fully-loaded wire winding columns squeezes the empty wire winding column out of the through hole at the top and the empty wire winding column slides out the rotating disc; the concave ring-shaped grooves at the upper end of the fully-loaded wire winding column is clamped into the steel balls to complete positioning (as shown in FIGS. 2 and 3, the locking block and the locking groove are meshed with each other, so that the previously positioned wire heads and the wire tails are folded with each other; the effect of welding without shutdown is achieved, so that the technical effect of changing the wires without shutdown is achieved); as the fully-loaded wire winding column are successively positioned, the batching motor rotates reversely such that the wire storage plate fall to an initial position.

When the batching motor rotates reversely, the synchronization disc is pushed by an external force to move toward the rotating disc along the axis of the transmission steel pipe; at the same time, the contact rods slide along the outer wall of the transmission steel pipe. When the synchronization ring-shaped groove on the synchronization disc is in contact with the synchronization ring-shaped block, the rotating disc starts to accelerate the synchronization disc by friction force; the synchronization block in the gradient groove of the synchronization disc is subjected to centrifugal force and slides toward the outer ring against the force of the centrifugal spring, so that the synchronization block slides to the outer side along the gradient groove; when the rotating speed is nearly close (as show in FIGS. 6 and 7, by means of the centrifugal force from the rotating of the rotating disc, the synchronization block is thrown to the outer side of the synchronization disc, the synchronization block is clamped with the synchronization clamping groove, and the moment arm for driving the synchronization disc by the rotating disc is increased; in this way, the equipment damage caused by driving the synchronization disc and the rotating disc to move only through the friction force is avoided, and inaccurate positioning between the synchronization disc and the rotating disc is avoided), the synchronization block is clamped into the synchronization clamping groove so as to enable the synchronization disc and the rotating disc to rotate at the same speed; the synchronization disc is continuously pushed by the external force such that the synchronization disc attaches to the rotating disc; meanwhile, the tail end of the clamping bar rotates as the transmission steel pipe with a centripetal force that is kept outward all the time; when the large chamfer of the synchronization disc passes through the tail end of the clamping bar (as shown in FIGS. 4 and 5), the clamping bars is no longer restrained by an outside hole, from which the synchronization disc is sleeved at the center on the transmission steel pipe; when the synchronization disc and the rotating disc rotate at the same speed, the clamping bars are determined to be opposite to the contact rods; the clamping bars are unfolded by the centripetal force; as the rotating disc continues to axially slide along the transmission steel pipe, the tail ends of the clamping bars push the contact rods to rotate around the hinged joints so as to push the fully-loaded wire winding columns on the synchronization disc to the upper end surfaces of the wire storage plate, so that the fully-loaded wire winding columns are in preparation states; at the moment, the external force is used for driving the synchronization disc to move backwards again and separate from the rotating disc; the moving states of the parts are opposite; repeated description is not made herein; wire batching of the fully-loaded wire winding columns is carried out after waiting until the synchronization disc is static; and the processes are circulated in turn.

With driving of the synchronization disc and the rotating disc, the wire winding column is prepared for batching; with operations of the eddy current coils and the batching motor, the empty wire winding column is replaced with a fully-loaded wire winding column without shutdown. Thus, the equipment is capable of batching without shutdown in the running process, and the problems of poor work sustainability and low working efficiency of the equipment caused by repeatedly batching and shutting down are effectively solved.

As a further solution of the present application, the winding mechanism includes a wire winding disc; the wire winding disc is coaxially arranged on an outer wall of the transmission steel pipe; threading slots are formed in the wire winding disc; an outer wall of the wire winding disc is rotatably connected with an upper end surface of the loading plate by a bracket plate; an outer toothed plate is rotatably connected in each threading slot; an outer side of each outer toothed plate engages with a driving gear; the driving gear is rotatably connected in the wire winding disc; an outer wall of each driving gear is fixedly connected with a shifting rod; the shifting rod is slidably connected in a groove on an outer side of the threading slot; and a torsion spring is connected between an axis of the driving gear and the wire winding disc.

In operation, the sub-wires are directly pulled to the sides of the threading slots; the sub-wires are directly pulled to the middle parts of the threading slots; the sub-wires touch the shifting rods; the driving gears rotate anticlockwise when the shifting rods are shifted; the driving gears rotate and drive the outer toothed plates to rotate clockwise by overcoming the torsion of the torsion springs (as shown in FIG. 9 and seen from the right side); when the outer toothed plates rotate, the threading slots are opened; when the sub-wires are pulled to the middlemost parts of the threading slots, the driving gears rotate clockwise again under action of the force of the torsion springs, so that the outer toothed plates rotate clockwise to be closed so as to clamp the sub-wires in the middle parts of the threading slots.

The shifting rods rotate to drive the outer toothed plates to rotate, so that the sub-wires can be directly pulled from the side of the wire winding disc to the middle parts of the threading slots without passing through the through holes, and the problems that the inconvenience is caused, the time is wasted and the working efficiency is reduced in the threading process are effectively solved.

As a further solution of the present application, the surface of each threading slot is covered with the friction reducing material, so that the friction is reduced, and the service life of the equipment is prolonged.

As a further solution of the present application, each shifting rod is made of the friction reducing material, so that the friction is reduced, and the service life of the equipment is prolonged.

As a further solution of the present application, the motor adopts a speed reducing motor, so that the torque is increased, the equipment speed is reduced, and the problem of equipment shutdown caused when the replaced wire winding columns are thrown out due to excessively great centrifugal force can be avoided.

As a further solution of the present application, grooves are formed in the wire storage plate and the replacing plates, so that the wire winding columns can accurately and quickly reach the wire storage plate from the replacing plates, the working errors are reduced, and the problem of low working efficiency caused by shutdown can be avoided.

Compared with the prior art, the batching system for producing the special cables has the beneficial effects: 1. through acceleration between the synchronization disc and the rotating disc, the wire winding columns are used for making addition preparation, then the eddy current coils and the batching motor work to replace the fully-loaded wire winding columns and the empty wire winding columns without shutdown, the equipment is capable of batching without shutdown in the running process, and the problems of poor work sustainability and low working efficiency of the equipment caused by repeatedly batching and shutting down are effectively solved;

2. the shifting rods rotate to drive the outer toothed plates to rotate, so that the sub-wires can be directly pulled from the side of the wire winding disc to the middle parts of the threading slots by not passing through the through holes, and the problems that the inconvenience is caused, the time is wasted and the working efficiency is reduced in the threading process are effectively solved.

BRIEF DESCRIPTION OF THE DRAWINGS

In order to more clearly describe the technical solutions of the embodiments of the present application, the drawings needed to be used for describing the embodiments will be briefly introduced below. Apparently, the drawings described below are only some embodiments of the present application. Those of ordinary skill in the art can also obtain other drawings according to the drawings on the premise of not contributing creative work.

DETAILED DESCRIPTION

Figure 1:
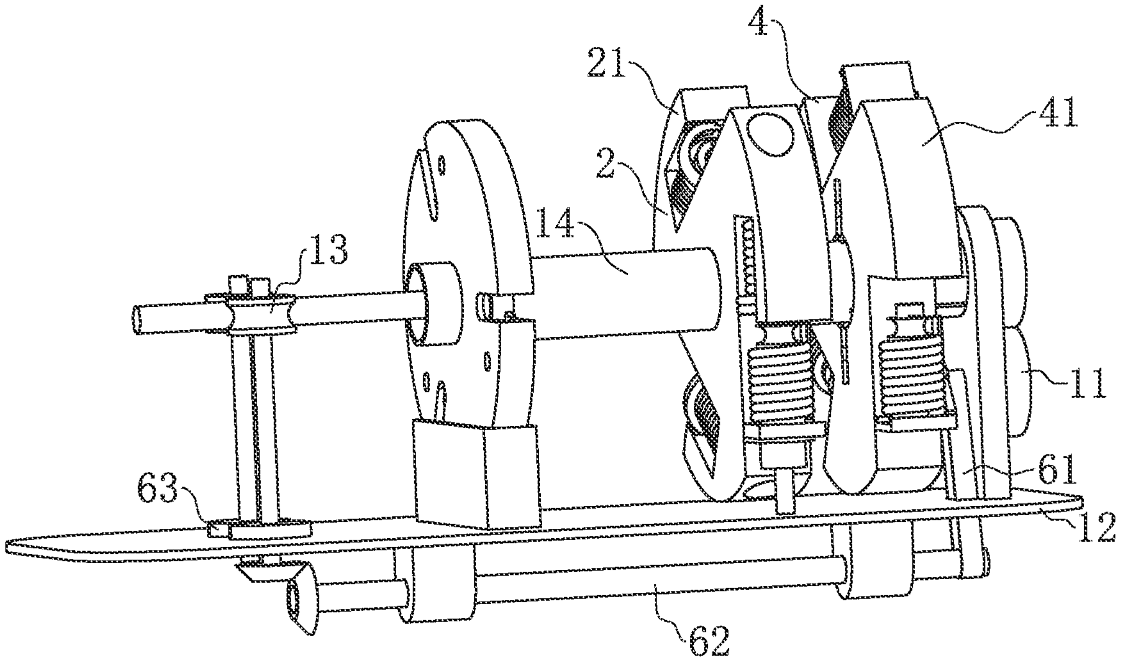
FIG. 1 is an overall structural schematic diagram of the present application.

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments of the present application, all other embodiments obtained by those of ordinary skill in the art without creative work shall fall within the protection scope of the present application.

With reference to FIGS. 1-9, the present application provides a technical solution as follows. A batching system for producing special cables includes a motor 11, a loading plate 12, wire pulling rollers 13, a transmission steel pipe 14 and a batching motor 15. The transmission steel pipe 14 is rotatably connected to an upper end surface of the loading plate 12 through a bracket. The motor 11 is fixedly arranged on a side wall of a mounting bracket. The wire pulling roller 13 is rotatably connected to an upper end surface of the loading plate 12. The batching system for producing the special cables further includes a wiring mechanism 2, a replacing mechanism 4 and a driving mechanism 6. The wiring mechanism 2 is coaxially and fixedly connected to an outer end surface of the transmission steel pipe 14. The replacing mechanism 4 is sleeved on the outer end surface of the transmission steel pipe 14. The driving mechanism 6 is fixedly mounted on a lower end surface of the loading plate 12. A winding mechanism 7 for winding wires is coaxially and fixedly arranged on the transmission steel pipe 14.

The wiring mechanism 2 includes a rotating disc 21 that is coaxially fixed on an outer wall of the transmission steel pipe 14. The rotating disc 21 is provided with a plurality of wire storage slot 22 around an axis of the rotating disc 21. A baffle 23 is arranged on side walls of the wire storage slot 22. A wire storage plate 24 that is slidably connected to the side walls of the wire storage slot 22 is arranged above the baffle 23. One end of a screw 25 is rotatably arranged at the lower end of the wire storage plate 24. The screw 25 passes through and is in threaded connection with the baffle 23. The other end of the screw 25 that passes through the baffle 23 is axially slidably connected to an output shaft of a batching motor 15 below the lower end of the baffle 23. A bottom surface of a wire winding column 26 is horizontally and slidably connected with the wire storage plate 24. A concave ring-shaped groove 261 is formed at the upper portion of the wire winding column 26. A locking block 262 for synchronizing speeds of upper and lower wire winding columns 26 is arranged at the top end of each wire winding column 26. A locking groove 263 is formed in the lower end surface of each wire winding column 26. A through hole 27 with a diameter same as that of the wire winding column 26 is formed in the top end of the wire storage slot 22. One end of a compression spring 28 that faces towards the axis of the through hole 27 is fixedly arranged in an squeezing groove formed around the axis of the through hole 27 on the side wall of the upper end of the through hole 27. A steel ball 29 corresponding to the concave ring-shaped groove 261 is fixedly arranged at the other end of the compression spring 28. An eddy current coil 30 for heating welding wire heads and wire tails is fixedly arranged in the middle of the wire storage slot 22.

The replacing mechanism 4 includes a synchronization disc 41. A large chamfer is arranged at the center of the rear end of the synchronization disc 41. A plurality of replacing grooves 42 are formed in the synchronization disc 41 around the axis. Each replacing groove 42 is fixedly connected with a replacing plate 43. Each replacing plate 43 is slidably connected with a wire winding column 26. The bottom end of each wire winding column 26 is in contact with one end of a contact rod 44. The middle of each contact rod 44 is rotatably connected with an end surface of the synchronization disc 41. The other end of each contact rod 44 is in contact connection with the outer wall of the transmission steel pipe 14. A sliding groove 45 is axially formed on the transmission steel pipe 14. Clamping bars 46 are rotatably arranged in the sliding groove 45.

A gradient groove 51 is formed in an end surface close to the rotating disc 21 of the synchronization disc 41. The gradient groove 51 gradually becomes shallow as going further away from the axis of the synchronization disc 41. The inner bottom surface of the gradient groove 51 is slidably connected with a synchronization block 52. The side walls close to the axis of the synchronization block 52 and the gradient groove 51 are respectively fixedly connected with two ends of a centrifugal spring 53. A synchronization ring-shaped groove 54 that is coaxial with the synchronization disc 41 is formed in the middle of the synchronization disc 41. A synchronization clamping groove 55 that matches with the synchronization block 52 is formed in the side wall close to the synchronization disc 41 of the rotating disc 21. An end surface close to the synchronization disc 41 of the rotating disc 21 is fixedly connected with a synchronization ring-shaped block 56 corresponding to the synchronization ring-shaped groove 54.

The driving mechanism 6 includes a synchronization belt 61 that is sleeved on an outer side of an output shaft passing through the bracket of the motor 11. The synchronization belt 61 passes through an avoiding hole of the loading plate 12 to connect with a transmission shaft of a transmission assembly 62. The transmission assembly 62 transmits power to shafts passing through the loading plate 12 of wire pulling rollers 13. Two wire pulling rollers 13 are respectively coaxially and fixedly connected with a synchronization gear 63. The synchronization gears 63 engage with each other.

Figure 2:
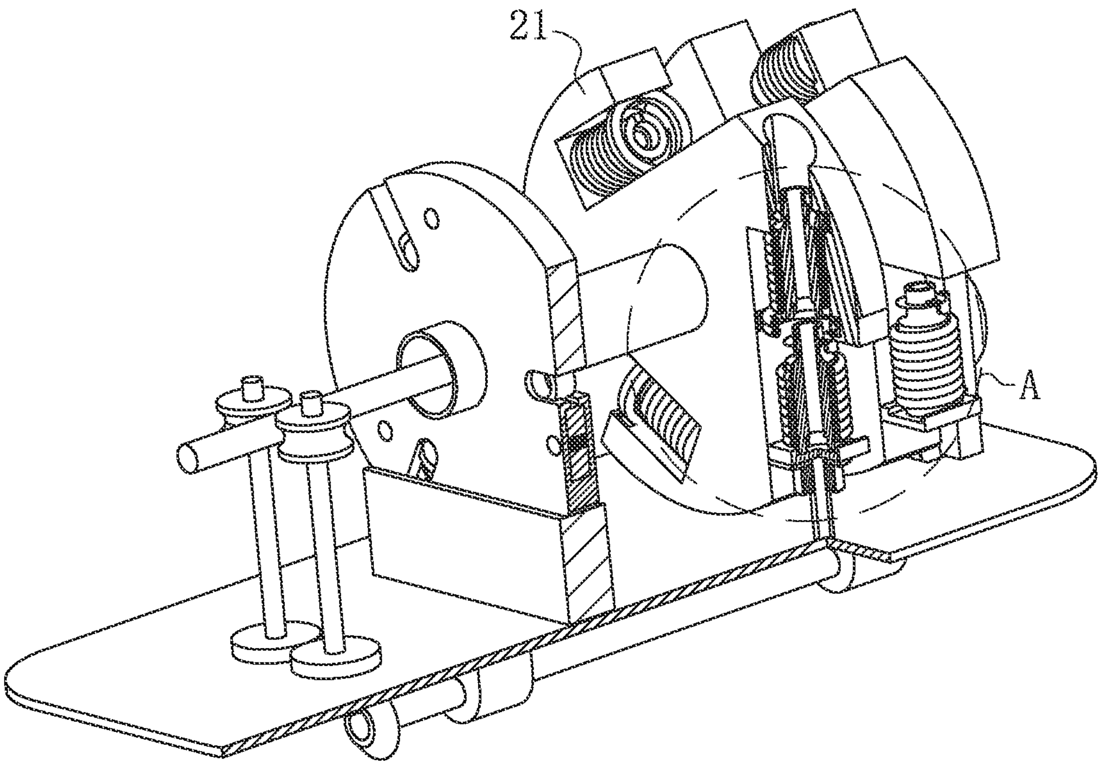
FIG. 2 is a right front partial sectional structural schematic diagram of the present application.
Figure 3:
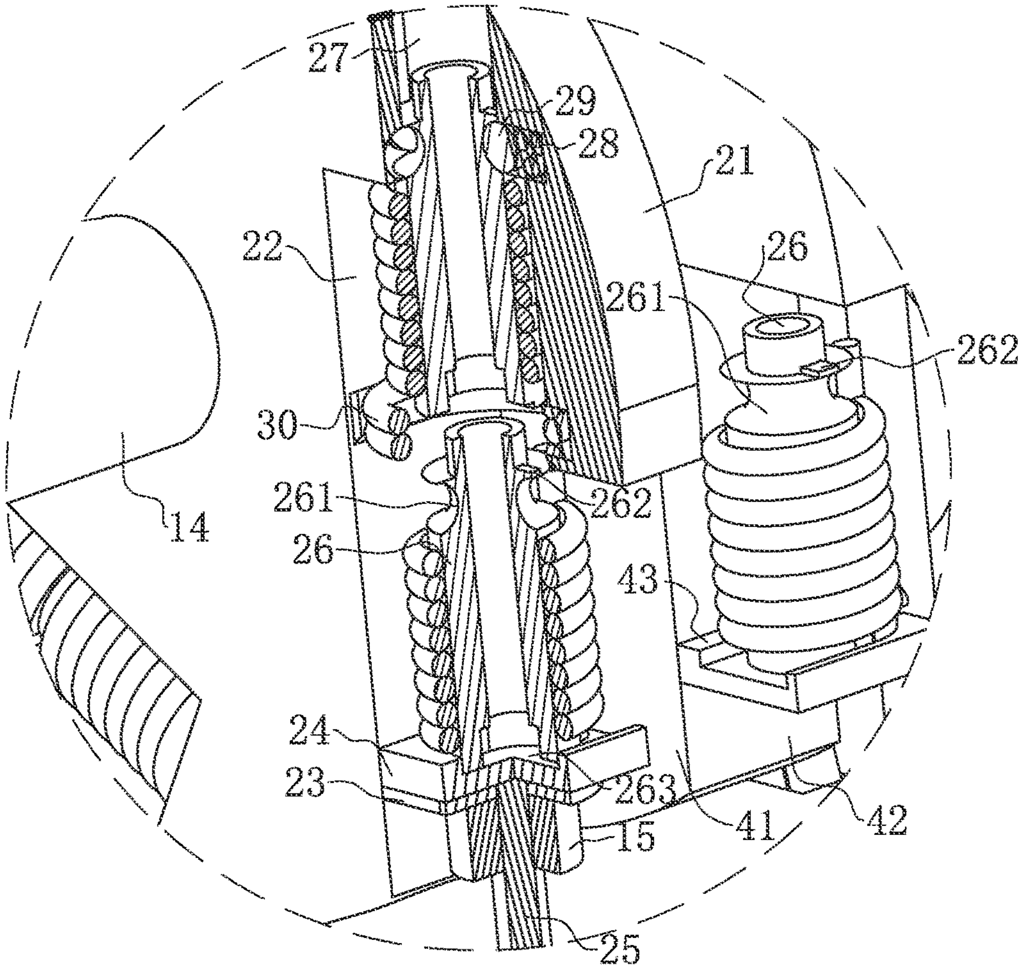
FIG. 3 is an enlarged structural schematic diagram of a part A in FIG. 2 of the present application.
Figure 4:
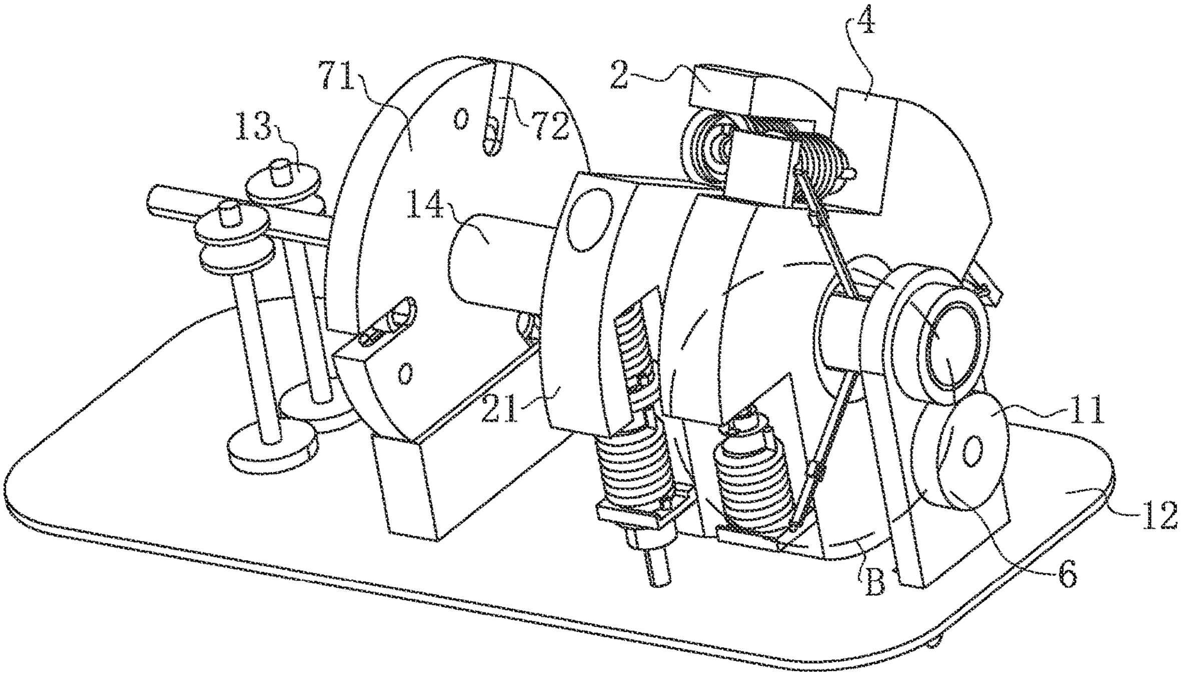
FIG. 4 is a right rear vertical structural schematic diagram of the present application.

In operation, the equipment is assembled and fixed; the cable core passes through the transmission steel pipe 14 and the wire pulling rollers 13 in turn; a plurality of sub-wires pass through the winding mechanism 7 and are wound on the outer side of the cable core; the motor 11 is started to rotate clockwise (see from the right side of FIG. 4), so that the motor 11 drives the transmission steel pipe 14 to rotate anticlockwise; the transmission steel pipe 14 rotates to drive the rotating disc 21 to rotate and also drive the winding mechanism 7 to rotate at the same time; meanwhile, the motor 11 drives the transmission assembly 62 through the synchronization belt 61 to operate; the transmission assembly 62 drives a wire pulling roller 13 on the left side to rotate anticlockwise (as shown in FIG. 4); the lower ends of the two wire pulling rollers 13 rotate with the same speeds by means of the synchronization gears 63 so as to pulling the wound cables to a next process; after sub-wires on the wire winding column 26 in a working position are used up, the batching motor 15 is started to rotate; the batching motor 15 drives the wire storage plate 24 through the screws 25 to move upward along the wire storage slot 22 such that a fully-loaded wire winding column 26 moves upward to be close to the bottom end of the wire winding column 26 that is used up; the upper end of the lower wire winding column 26 is inserted into the center hole of the upper wire winding column 26; under the action of friction force, the upper wire winding column can enable the lower wire winding column 26 to rotate (as shown in FIG. 3); when the rotating speed of the lower wire winding columns 26 gradually approaches that of the upper wire winding columns 26, the batching motor 15 continues to rotate so that the locking block 262 of the lower wire winding columns 26 engages with the locking groove 263 of the upper wire winding column 26; at this moment, the eddy current coil 30 is started so that a tin-coated joint of the lower wire winding column 26 is connected with the tail end of the upper wire winding column 26. As the winding continues, the batching motor 15 continues to operate to drive the fully-loaded lower wire winding column 26 moves up along the side wall of the wire storage slot 22, such that the concave ring-shaped groove 261 of the empty upper wire winding column 26 squeezes the steel balls 29 and the steel balls 29 further squeeze the compression springs 28 to retract to the squeezing groove; as the batching motor 15 continues to move, the fully-loaded wire winding columns 26 squeezes the empty wire winding column 26 out of the through hole 27 at the top and the empty wire winding column 26 slides out the rotating disc 21; the concave ring-shaped grooves 261 at the upper end of the fully-loaded wire winding column 26 is clamped into the steel balls 29 to complete positioning (as shown in FIGS. 2 and 3, the locking block 262 and the locking groove 263 are meshed with each other, so that the previously positioned wire heads and the wire tails are folded with each other; the effect of welding without shutdown is achieved, so that the technical effect of changing the wires without shutdown is achieved); as the fully-loaded wire winding column 26 are successively positioned, the batching motor 15 rotates reversely such that the wire storage plate 24 fall to an initial position.

Figure 5:
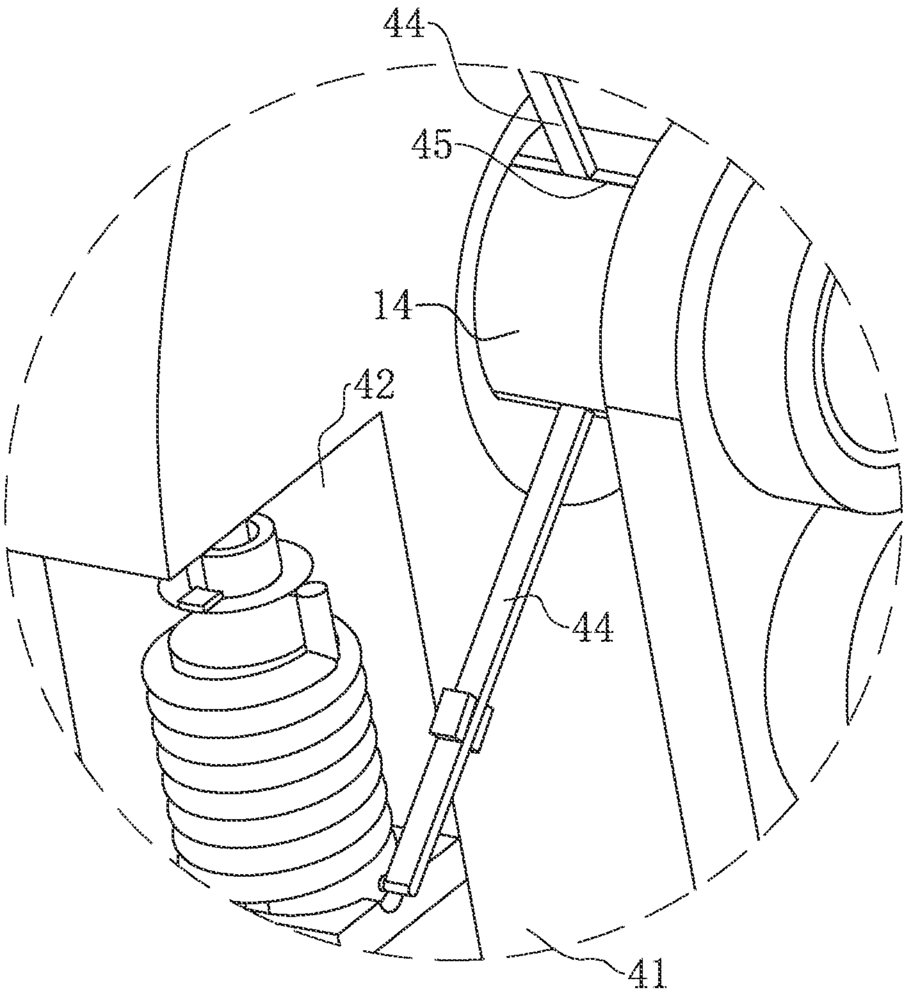
FIG. 5 is an enlarged structural schematic diagram of a part B in FIG. 4 of the present application.
Figure 6:
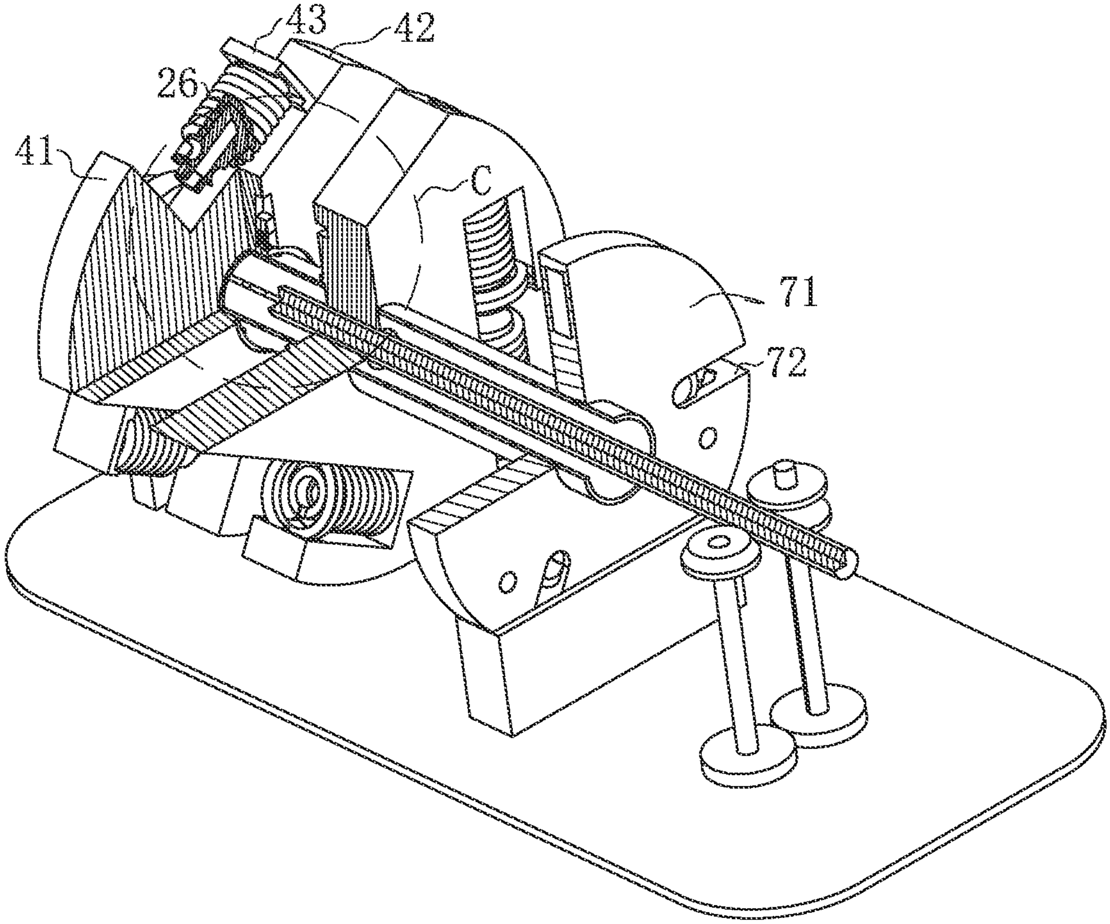
FIG. 6 is a left front vertical partial sectional structural schematic diagram of the present application.
Figure 7:
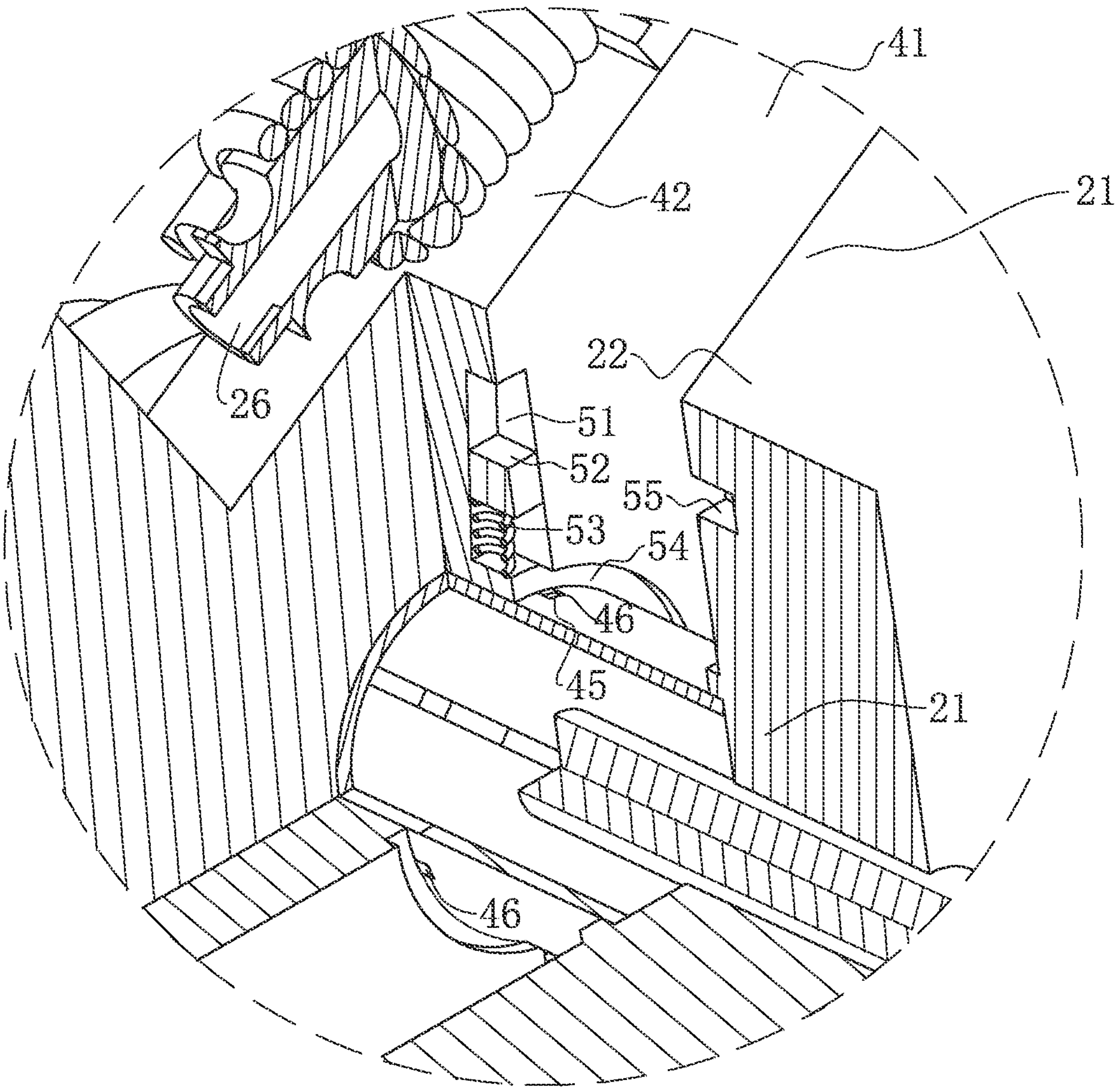
FIG. 7 is an enlarged structural schematic diagram of a part C in FIG. 6 of the present application.
Figure 8:
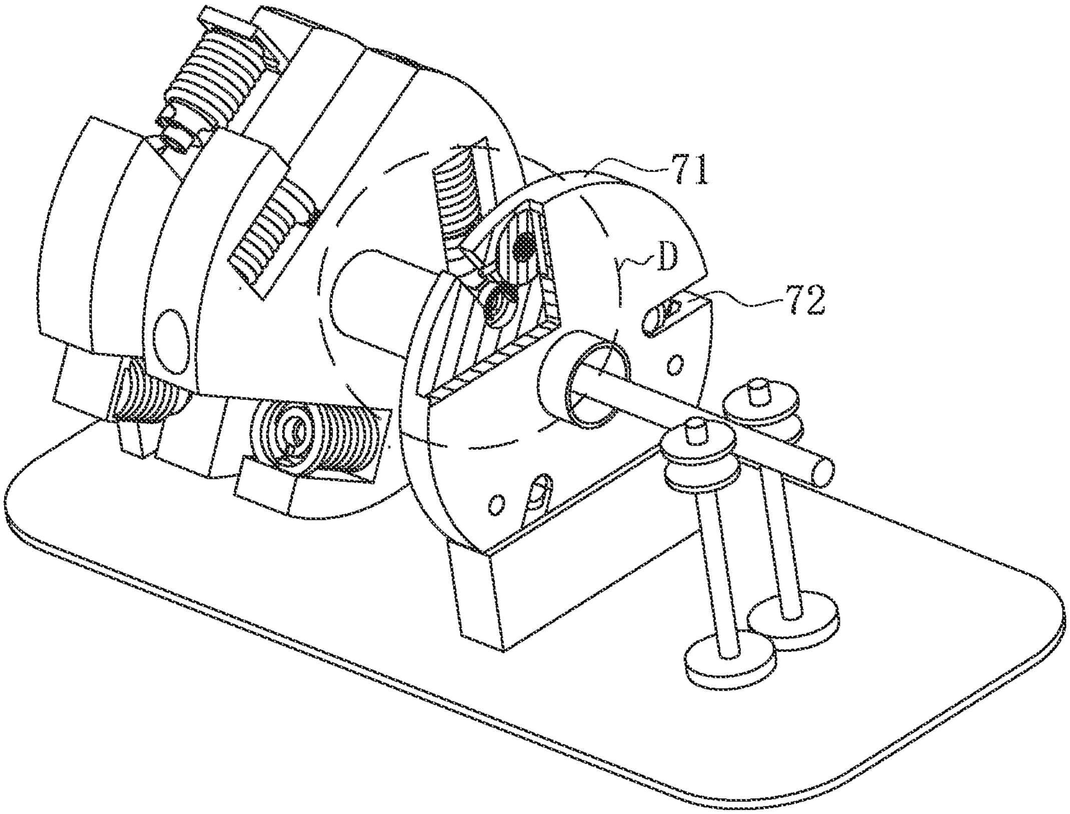
FIG. 8 is a left front vertical partial sectional structural schematic diagram of the present application.

When the batching motor 15 rotates reversely, the synchronization disc 41 is pushed by an external force to move toward the rotating disc 21 along the axis of the transmission steel pipe 14; at the same time, the contact rods 44 slide along the outer wall of the transmission steel pipe 14. When the synchronization ring-shaped groove 54 on the synchronization disc 41 is in contact with the synchronization ring-shaped block 56, the rotating disc 21 starts to accelerate the synchronization disc 41 by friction force; the synchronization block 52 in the gradient groove 51 of the synchronization disc 41 is subjected to centrifugal force and slides toward the outer ring against the force of the centrifugal spring 53, so that the synchronization block 52 slides to the outer side along the gradient groove 51; when the rotating speed is nearly close (as show in FIGS. 6 and 7, by means of the centrifugal force from the rotating of the rotating disc, the synchronization block 52 is thrown to the outer side of the synchronization disc 41, the synchronization block 52 is clamped with the synchronization clamping groove 55, and the moment arm for driving the synchronization disc 41 by the rotating disc 21 is increased; in this way, the equipment damage caused by driving the synchronization disc 41 and the rotating disc 21 to move only through the friction force is avoided, and inaccurate positioning between the synchronization disc 41 and the rotating disc 21 is avoided), the synchronization block 52 is clamped into the synchronization clamping groove 55 so as to enable the synchronization disc 41 and the rotating disc 21 to rotate at the same speed; the synchronization disc 41 is continuously pushed by the external force such that the synchronization disc 41 attaches to the rotating disc 21; meanwhile, the tail end of the clamping bar 46 rotates as the transmission steel pipe 14 with a centripetal force that is kept outward all the time; when the large chamfer of the synchronization disc 41 passes through the tail end of the clamping bar 46 (as shown in FIGS. 4 and 5), the clamping bars 46 is no longer restrained by an outside hole, from which the synchronization disc 41 is sleeved at the center on the transmission steel pipe 14; when the synchronization disc 41 and the rotating disc 21 rotate at the same speed, the clamping bars 46 are determined to be opposite to the contact rods 44; the clamping bars 46 are unfolded by the centripetal force; as the rotating disc 21 continues to axially slide along the transmission steel pipe 14, the tail ends of the clamping bars 46 push the contact rods 44 to rotate around the hinged joints so as to push the fully-loaded wire winding columns 26 on the synchronization disc 41 to the upper end surfaces of the wire storage plate 24, so that the fully-loaded wire winding columns 26 are in preparation states; at the moment, the external force is used for driving the synchronization disc 41 to move backwards again and separate from the rotating disc 21; the moving states of the parts are opposite; repeated description is not made herein; wire batching of the fully-loaded wire winding columns 26 is carried out after waiting until the synchronization disc 41 is static; and the processes are circulated in turn.

With driving of the synchronization disc 41 and the rotating disc 21, the wire winding column 26 is prepared for batching; with operations of the eddy current coils 30 and the batching motor 15, the empty wire winding column is replaced with a fully-loaded wire winding column 26 without shutdown. Thus, the equipment is capable of batching without shutdown in the running process, and the problems of poor work sustainability and low working efficiency of the equipment caused by repeatedly batching and shutting down are effectively solved.

As a further solution of the present application, the winding mechanism 7 includes a wire winding disc 71; the wire winding disc 71 is coaxially arranged on an outer wall of the transmission steel pipe 14; threading slots 72 are formed in the wire winding disc 71; an outer wall of the wire winding disc 71 is rotatably connected with an upper end surface of the loading plate 12 by a bracket plate; an outer toothed plate 73 is rotatably connected in each threading slot 72; an outer side of each outer toothed plate 73 engages with a driving gear 74; the driving gear 74 is rotatably connected in the wire winding disc 71; an outer wall of each driving gear 74 is fixedly connected with a shifting rod 75; the shifting rod 75 is slidably connected in a groove on an outer side of the threading slot 72; and a torsion spring 76 is connected between an axis of the driving gear 74 and the wire winding disc 71.

Figure 9:
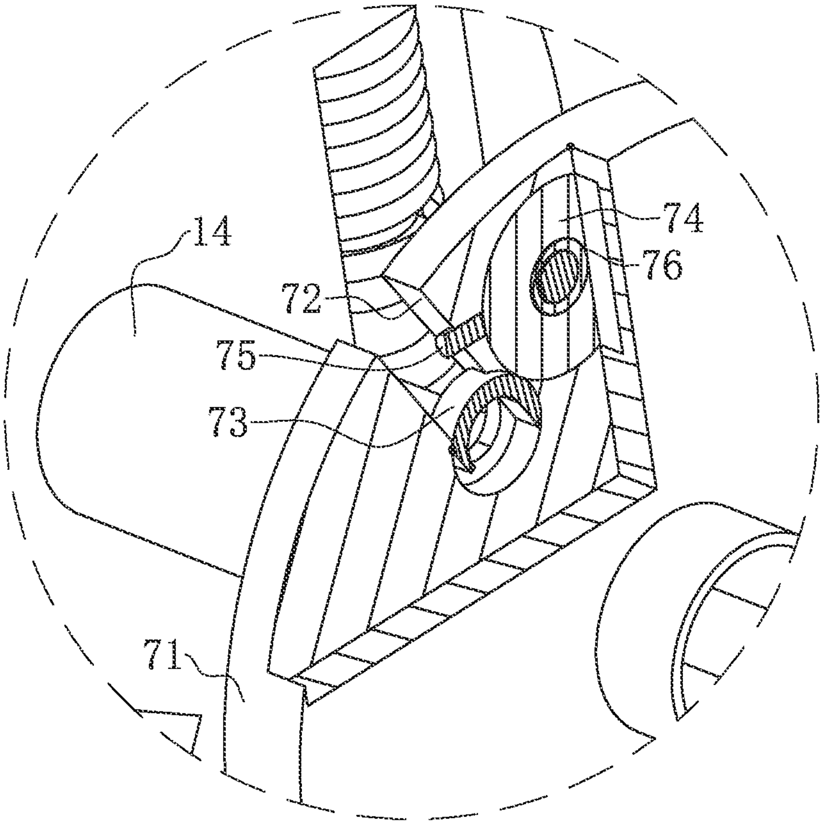
FIG. 9 is an enlarged structural schematic diagram of a part D in FIG. 8 of the present application.

In operation, the sub-wires are directly pulled to the sides of the threading slots 72; the sub-wires are directly pulled to the middle parts of the threading slots 72; the sub-wires touch the shifting rods 75; the driving gears 74 rotate anticlockwise when the shifting rods 75 are shifted; the driving gears 74 rotate and drive the outer toothed plates 73 to rotate clockwise by overcoming the torsion of the torsion springs 76 (as shown in FIG. 9 and seen from the right side); when the outer toothed plates 73 rotate, the threading slots 72 are opened; when the sub-wires are pulled to the middlemost parts of the threading slots 72, the driving gears 74 rotate clockwise again under action of the force of the torsion springs 76, so that the outer toothed plates 73 rotate clockwise to be closed so as to clamp the sub-wires in the middle parts of the threading slots 72.

The shifting rods 75 rotate to drive the outer toothed plates 73 to rotate, so that the sub-wires can be directly pulled from the side of the wire winding disc 71 to the middle parts of the threading slots 72 without passing through the through holes, and the problems that the inconvenience is caused, the time is wasted and the working efficiency is reduced in the threading process are effectively solved.

As a further solution of the present application, the surface of each threading slot 72 is covered with a friction reducing material, so that the friction is reduced, and the service life of the equipment is prolonged.

As a further solution of the present application, each shifting rod 75 is made of the friction reducing material, so that the friction is reduced, and the service life of the equipment is prolonged.

As a further solution of the present application, the motor 11 adopts a speed reducing motor, so that the torque is increased, the equipment speed is reduced, and the problem of equipment shutdown caused when the replaced wire winding columns 26 are thrown out due to excessively great centrifugal force can be avoided.

As a further solution of the present application, grooves are formed in the wire storage plate 24 and the replacing plates 43, so that the wire winding columns can accurately and quickly reach the wire storage plate 24 from the replacing plates 43, the working errors are reduced, and the problem of low working efficiency caused by shutdown can be avoided.

The working principle is as follows: when working, the equipment is assembled and fixed; the cable core passes through the transmission steel pipe 14 and then passes through the wire pulling rollers 13; a plurality of sub-wires pass through the winding mechanism 7 and are wound on the outer side of the cable core; then the motor 11 is started to rotate clockwise (see from the right side of FIG. 4), so that the motor 11 drives the transmission steel pipe 14 to anticlockwise rotate; the transmission steel pipe 14 rotates and firstly drives the rotating disc 21 to rotate and also drives the winding mechanism 7 to rotate at the same time; meanwhile, the motor 11 drives the transmission assembly 62 to work through the synchronization belt 61; the transmission assembly 62 drives a wire pulling roller 13 on the left side to rotate anticlockwise (as shown in FIG. 4); the lower ends of the two wire pulling rollers 13 are used for achieving same left and right speeds through the synchronization gears 63 and pulling the wound cables to a next process; after sub-wires on the wire winding column 26 in a working position are used up, the batching motor 15 is started to rotate; the batching motor 15 is used for driving the wire storage plate 24 to move upward along the wire storage slot 22 through the screws 25; the fully-loaded wire winding columns 26 move upward to be close to the bottom ends of the wire winding columns 26 which are used up; the ends of the upper ends of the wire winding columns 26 are inserted into the middle holes of the wire winding columns 26 on the upper ends; under the action of friction force, the upper wire winding columns can enable the lower wire winding columns 26 to start rotating (shown in FIG. 3); when the rotating speeds of the lower wire winding columns 26 are gradually close to that of the upper wire winding columns 26, the batching motor 15 continues to rotate, so that the locking blocks 262 of the lower wire winding columns 26 are combined with the locking grooves 263 of the upper wire winding columns 26; at the moment, the eddy current coils 30 are started, so that tin-coated joints of the wire winding columns 26 at the lower ends are connected with tails of the wire winding columns 26 at the upper ends; as winding continues to carry out, the batching motor 15 continues to carry out; the fully-loaded wire winding columns 26 at the lower ends continue to jack up along the side walls of the wire storage slot 22; the concave ring-shaped grooves 261 of empty wire winding columns 26 at the upper ends squeeze the steel balls 29, so that the steel balls 29 squeeze the compression springs 28 to retract to the formed squeezing grooves; as the batching motor 15 continues to move, the fully-loaded wire winding columns 26 squeezes the empty wire winding columns 26 from the through holes 27 in the upper part; the rotating disc 21 slides out; the concave ring-shaped grooves 261 in the upper ends of the fully-loaded wire winding columns 26 are clamped into the steel balls 29 to complete positioning (as shown in FIG. 2 and FIG. 3), the locking blocks 262 and the locking grooves 263 are meshed with each other, so that the previously positioned wire heads and the wire tails are folded with each other; the effect of welding without shutdown is achieved, so that the technical effect of changing the wires without shutdown is achieved); as the fully-loaded wire winding columns 26 are successively positioned, the batching motor 15 rotates reversely, the wire storage plate 24 fall to an initial position; when the batching motor 15 rotates reversely, the external force is used for pushing the synchronization disc 41 to the rotating disc 21 along the axis of the transmission steel pipe 14; at the same time, the contact rods 44 slide along the outer wall of the transmission steel pipe 14; when the synchronization ring-shaped groove 54 in the synchronization disc 41 is in contact with the synchronization ring-shaped block 56; the rotating disc 21 starts to accelerate the synchronization disc 41 through friction force; the synchronization block 52 in the gradient groove 51 of the synchronization disc 41 can slide to an outer ring by overcoming the force of the centrifugal spring 53 under the action of the centrifugal force, so that the synchronization block 52 slides to the outer side along the gradient groove 51; when the rotating speed is nearly close (as show in FIG. 6 and FIG. 7, the effect of the centrifugal force is used for throwing the synchronization block 52 to the outer side of the synchronization disc 41 by using the rotating speed of the rotating disc, the synchronization block 52 is clamped with the synchronization clamping groove 55, the moment arm for driving the synchronization disc 41 of the rotating disc 21 is increased, the equipment damage caused by driving the synchronization disc 41 and the rotating disc 21 to move only through the friction force is avoided, and inaccurate positioning between the synchronization disc 41 and the rotating disc 21 is avoided); the synchronization block 52 is clamped into the synchronization clamping groove 55 so as to enable the synchronization disc 41 and the rotating disc 21 to rotate at the same speed; the external force is used for continuously pushing the synchronization disc 41 and enabling the synchronization disc 41 and the rotating disc 21 to be attached; meanwhile, the tail ends of the clamping bars 46 rotate along the transmission steel pipe 14, so that the centripetal force is kept outward all the time; when the large chamfer of the synchronization disc 41 passes through the tail ends of the clamping bars 46 (as shown in FIG. 4 and FIG. 5), the clamping bars 46 cannot be restrained by the center of the synchronization disc 41 sleeved on an outer side hole of the transmission steel pipe 14; when the synchronization disc 41 and the rotating disc 21 rotate, the clamping bars 46 are determined to be opposite to the positions of the contact rods 44; the clamping bars 46 start to be unfolded by the centripetal force; as the rotating disc 21 continues to axially slide along the transmission steel pipe 14, the tail ends of the clamping bars 46 push the contact rods 44 to rotate around the hinged joint so as to push the fully-loaded wire winding columns 26 on the synchronization disc 41 to the upper end surfaces of the wire storage plate 24, so that the fully-loaded wire winding columns 26 are in preparation states; at the moment, the external force is used for driving the synchronization disc 41 to move backwards again and separate from the rotating disc 21; the moving states of the parts are opposite; repeated description is not made herein; wire batching of the fully-loaded wire winding columns 26 is carried out after waiting until the synchronization disc 41 is static; and the processes are circulated in turn.

In the description of the Description, the description with reference to the terms such as “one embodiment”, “example”, “specific example” and the like means that the specific features, structures, materials or characteristics described in combination with the embodiment or example are included in at least one embodiment or example of the present application. In the Description, the schematic description of the above-mentioned terms does not refer to the same embodiments or examples. Moreover, the described specific features, structures, materials or characteristics can be combined in any one or more embodiments or examples in a suitable manner.

The preferred embodiments of the present application disclosed above are only used for helping to illustrate the present application. The preferred embodiments do not describe all the details in detail and also do not limit the present application to only the described specific embodiments. Obviously, many modifications and changes can be made according to the content of the Description. The embodiments are selected and are specifically described in the Description in order to better explain the principles and practical application of the present application, so that those of skill in the art can understand and use the present application well. The present application is only limited by the Claims and full scope and equivalents thereof.

List of reference signs: 11, motor; 12, loading plate; 13, wire pulling roller; 14, transmission steel pipe; 15, batching motor; 2, wiring mechanism; 21, rotating disc; 22, wire storage slot; 23, baffle; 24, wire storage plate; 25, screw; 26, wire winding column; 261, concave ring-shaped groove; 262, locking block; 263, locking groove; 27, through hole; 28, compression spring; 29, steel ball; 30, eddy current coil; 4, replacing mechanism; 41, synchronization disc; 42, replacing groove; 43, replacing plate; 44, shifting rod; 45, sliding groove; 46, clamping bar; 51, gradient groove; 52, synchronization block; 53, centrifugal spring; 54, synchronization ring-shaped groove; 55, synchronization clamping groove; 56, synchronization ring-shaped block; 6, driving mechanism; 61, synchronization belt; 62, transmission assembly; 63, synchronization gear; 7, winding mechanism; 71, wire winding disc; 72, threading slot; 73, outer toothed plate; 74, driving gear; 75, shifting rod; 76, torsion spring.

What is claimed is:

1. A batching system for producing special cables, comprising: a motor, a loading plate, wire pulling rollers, a transmission steel pipe and a batching motor, wherein, the transmission steel pipe is rotatably connected to an upper end surface of the loading plate by a bracket; the motor is fixedly arranged on a side wall of a mounting bracket; the wire pulling rollers are rotatably connected to an upper end surface of the loading plate; and wherein, the batching system for producing the special cables further comprises: a wiring mechanism, a replacing mechanism and a driving mechanism; the wiring mechanism is coaxially and fixedly connected with an outer end surface of the transmission steel pipe; the replacing mechanism is sleeved on the outer end surface of the transmission steel pipe; the driving mechanism is fixedly mounted on a lower end surface of the loading plate; a winding mechanism for winding wires is coaxially and fixedly arranged on the transmission steel pipe;

the wiring mechanism comprises a rotating disc that is coaxially fixed on an outer wall of the transmission steel pipe; a plurality of wire storage slot surrounding an axis are formed on the rotating disc; a baffle is arranged on a side wall of the wire storage slot; a wire storage plate that is slidably connected to a side wall of the wire storage slot is arranged above the baffle; one end of a screw is rotatably arranged at a lower end of the wire storage plate; the screw passes through the baffle and is in threaded connection with the baffle; the screw passes through other end of the baffle and is axially slidably connected to an output shaft of the batching motor at a lower end of the baffle; a bottom surface of a wire winding column is horizontally slidably arranged on the wire storage plate; a concave ring-shaped groove is provided at an upper end of the wire winding column; a locking block for synchronizing speeds of an upper and a lower wire winding column is provided at a top end of the wire winding column arranged on the wire storage plate; a locking groove is provided at a lower end surface of the wire winding column arranged on the wire storage plate; a through hole with a same diameter as that of the wire winding column arranged on the wire storage plate is formed at a top end of the wire storage slot; one end of a compression spring that faces towards an axis of the through hole is fixedly arranged in an squeezing groove formed around the axis of the through hole on a side wall of an upper end of the through hole; a steel ball corresponding to the concave ring-shaped groove is fixedly arranged at another end of the compression spring; an eddy current coil for heating welding wire heads and wire tails is fixedly arranged in a middle of the wire storage slot;

the replacing mechanism comprises a synchronization disc; a large chamfer is arranged at center of a rear end of the synchronization disc; a plurality of replacing grooves are formed in the synchronization disc around the axis of the through hole; each said replacing groove is fixedly connected with a replacing plate; each said replacing plate is slidably connected with a wire winding column; a bottom end of each wire winding column connected with each said replacing plate is in contact with one end of a contact rod; a middle of each said contact rod is rotatably connected with an end surface of the synchronization disc; another end of each contact rod is in contact connection with an outer wall of the transmission steel pipe; a sliding groove is axially formed on the transmission steel pipe; clamping bars are rotatably arranged in the sliding groove;

a gradient groove is formed in an end surface close to the rotating disc of wiring mechanism; the gradient groove gradually becomes shallow as going further away from an axis of the synchronization disc; an inner bottom surface of the gradient groove is slidably connected with a synchronization block; side walls close to the axis of the synchronization block and the gradient groove are respectively fixedly connected with two ends of a centrifugal spring; a synchronization ring-shaped groove that is coaxial with the synchronization disc is formed in a middle of the synchronization disc; a synchronization clamping groove that matches with the synchronization block is formed in a side wall close to the synchronization disc of the rotating disc; an end surface close to the synchronization disc of the rotating disc is fixedly connected with a synchronization ring-shaped block corresponding to the synchronization ring-shaped groove; and the driving mechanism comprises a synchronization belt that is sleeved on an outer side of an output shaft passing through the bracket; the synchronization belt passes through an avoiding hole of the loading plate to connect to a transmission shaft of a transmission assembly; the transmission assembly transmits power to shafts passing through the loading plate of the wire pulling rollers; and two of the wire pulling rollers are respectively coaxially and fixedly connected with a synchronization gear.

2. The batching system for producing the special cables according to claim 1, wherein the winding mechanism comprises a wire winding disc; the wire winding disc is coaxially arranged on an outer wall of the transmission steel pipe; threading slots are formed in the wire winding disc; an outer wall of the wire winding disc is rotatably connected with an upper end surface of the loading plate by a bracket plate; an outer toothed plate is rotatably connected in each threading slot; an outer side of each outer toothed plate engages with a driving gear; the driving gear is rotatably connected in the wire winding disc; an outer wall of each driving gear is fixedly connected with a shifting rod; the shifting rod is slidably connected in a groove on an outer side of the threading slot; and a torsion spring is connected between an axis of the driving gear and the wire winding disc.

3. The batching system for producing the special cables according to claim 2, wherein the surface of the threading slot is covered with a friction reducing material.

4. The batching system for producing the special cables according to claim 2, wherein the shifting rod is made of a friction reducing material.

5. The batching system for producing the special cables according to claim 1, wherein the motor is a speed reducing motor.

6. The batching system for producing the special cables according to claim 1, wherein grooves are formed in the wire storage plate and the replacing plates.

* * * * *